US00RE41825E

(19) United States
(12) Reissued Patent
Buschmann

(10) Patent Number: US RE41,825 E
(45) Date of Reissued Patent: Oct. 19, 2010

(54) CARD READER

(76) Inventor: Ulrich Buschmann, Kapellenweg 4, D-89192 Rammingen (DE)

(21) Appl. No.: 11/933,674

(22) Filed: Nov. 1, 2007

Related U.S. Patent Documents

Reissue of:
(64) Patent No.: 6,959,864
Issued: Nov. 1, 2005
Appl. No.: 09/746,132
Filed: Dec. 21, 2000

(30) Foreign Application Priority Data

Dec. 28, 1999 (DE) ..... 199 63 403

(51) Int. Cl.
*G06K 7/08* (2006.01)

(52) U.S. Cl. ..... 235/451; 235/375; 235/380; 235/382; 235/442; 235/492

(58) Field of Classification Search ..... 235/451, 235/375, 380, 382, 442, 492
See application file for complete search history.

(56) References Cited

U.S. PATENT DOCUMENTS

| | | | |
|---|---|---|---|
| 4,709,136 | A | 11/1987 | Watanabe |
| 5,763,862 | A | 6/1998 | Jachimowicz et al. |
| 5,878,134 | A | 3/1999 | Handelman et al. |
| 5,933,328 | A | 8/1999 | Wallace et al. |
| 5,979,773 | A | 11/1999 | Findley et al. |
| 6,137,710 | A | 10/2000 | Iwasaki et al. |
| 6,405,369 | B1 | 6/2002 | Tsuria |
| 6,601,328 | B1 | 8/2003 | Benaquista et al. |
| 6,824,045 | B2 | 11/2004 | Yap et al. |
| 2002/0129527 | A1 | 9/2002 | Vandreuil |

FOREIGN PATENT DOCUMENTS

| | | | |
|---|---|---|---|
| DE | 68926141 | | 12/1996 |
| DE | 68926141 | T2 * | 12/1996 |
| DE | 19624079 | C1 * | 1/1998 |
| DE | 19624079 | | 1/1998 |
| DE | 19719275 | | 11/1998 |
| DE | 19719275 | A1 * | 11/1998 |
| DE | 29723669 | U1 * | 1/1999 |
| DE | 29723669 | | 1/1999 |
| EP | 0236846 | | 9/1987 |
| EP | 0313882 | A2 * | 5/1989 |
| EP | 0313882 | | 5/1989 |
| EP | 0911751 | | 4/1999 |
| EP | 0911751 | A2 * | 4/1999 |
| GB | 2317485 | | 3/1998 |

OTHER PUBLICATIONS

European Search Report for European Patent Application No. 00127716.9, mailed Feb. 19, 2002.

* cited by examiner

*Primary Examiner*—Daniel A Hess

(57) ABSTRACT

The invention relates to the design of card readers for cards equipped with memory. Such cards, and also the data stored in the memory of such cards, are generally utilized to produce and/or maintain operating states of technical devices. It is also known that the user personally can store data in certain areas of the memory. However, as the memory design and usage has been standardized for the most part and the memory capacity reserved for use by the user is relatively small, the memory capacity reserved for the user can only be increased by providing the device with additional cards equipped with memory. However, as all cards used in a device to supply the full functionality mast operate together in a prescribed manner, it is the task of the invention to specify a card reader that organizes this operation. To accomplish this, it is specified that a monitoring device 17 or a closing device 24 is present that prevents the insertion of a second card 11.1 when there is a first card 11.2 inserted in the first slot 12.2, or that ensures, when there are two cards 11 in the slots 12, that the first card 11.2 is removed from its corresponding slot 12 before second card 11.1 is removed.

24 Claims, 8 Drawing Sheets

CARD READER

Matter enclosed in heavy brackets [ ] appears in the original patent but forms no part of this reissue specification; matter printed in italics indicates the additions made by reissue.

*This application is a Reissue application of U.S. Ser. No. 09/746,132, filed Dec. 21, 2000, now U.S. Pat. No. 6,959, 864, granted Nov. 1, 2005, which claims priority to German Patent Application No. 199 63 403 filed Dec. 28, 1999.*

FIELD OF THE INVENTION

The invention relates to the design of card readers for cards equipped with memory.

BACKGROUND OF THE INVENTION

According to the background of the invention, card readers for cards equipped with memory are well known so that we do not need to go into more detail here in this context. However, to better understand the invention we state that all known card readers have a slot equipped with an insertion aperture in which the card equipped with memory is inserted. As such cards are used to produce and/or maintain operating states of electrical devices, there are contacts within the slot that, when the card is inserted in the slot, make contact with the contacts on the card and consequently connect the memory of the card with a read and/or write device. This allows the corresponding device to only be used when there is information stored in the memory of the card. Such cards equipped with memory could be, for example, the SIM cards used in mobile communication, without which the user cannot log into the network. Such cards equipped with memory are often designed so that not only data used to produce and/or maintain operating states is stored in the storage space of the memory, but so that there are also memory areas in which the user himself can write data. In this context we would like to refer again to the SIM cards used in mobile telephones that not only contain the data used to maintain the operating state of mobile telephones, but that also can store telephone numbers entered by the user, for example. This is especially practical because the user, when using another mobile telephone, also has the telephone book stored in the memory of his SIM card available when "his" SIM card is inserted. However, due to the standardization of the memory in the cards, the memory space provided for use by a user is very limited. The memory bottleneck created by the standardization is especially critical because more services and/or applications are constantly being created that need the memory space provided on the cards so that they can be used more flexibly. This need can be met, for example, by providing at least one other card equipped with memory for this purpose that, to increase flexibility, does not necessarily have to be identical to the standard card used in the corresponding application. However, due to the fact that this other card must function with the card already present, it is the task of the invention to specify a method and/or a card reader that prevents invalid states from arising when two cards are used.

SUMMARY OF THE INVENTION

The basic principle common to the various embodiments that a specific order is maintained when inserting or removing cards from the slots. If in accordance with one embodiment there is a second slot that also has an insertion aperture for inserting another card equipped with memory and if there is a closing device on the insertion device of the second slot that prevents a second card front being inserted or removed from the second slot when there is a card in the first slot, then malfunctions that can arise when a first card has already been inserted or logged in by subsequently inserting or logging in the second card or by prematurely removing or logging out the second card are prevented. This sequence of events is ensured in accordance with claim 2 in that there is a monitoring device that does not prevent the insertion of a card in the second slot, but that does prevent the logging in of a card inserted in the second slot when there is already a card in the first slot and that, when there is a card inserted in the second slot, monitors its position in the second slot and logs out the card located in the first slot when a change in position is detected.

Inserting cards into the slots is especially simple when the two slots are arranged one over the other and the insertion apertures of the two slots point in the same direction.

If in accordance with another embodiment the closing device is a movable cover equipped with a stop base that exposes the insertion aperture of the second slot when in a first position and blocks the insertion aperture when in its second position, where the stop base prevents the cover from moving when there is a card inserted in the first slot as the stop base is seated against the card 13 located in the first slot, then an especially inexpensive solution for controlling the insertion procedure exists.

The card reader is especially user-friendly when, in accordance with another embodiment, there is an ejection device in the second slot that pushes the card inserted in the second slot out of the insertion aperture when the closing device opens and provides access to the insertion device on the second slot.

The complexity of the ejection device is then very low when, in accordance with another embodiment, the ejection device comprises primarily of a mechanism that supplies the mechanical energy for ejecting the card inserted in the second slot only after closing and/or opening the closing device 24.

If the card reader is realized in accordance with another embodiment, then no special steps or components are required to bring a card placed in the second slot to its end position in the slot. On the contrary, in this implementation the card is brought to its end position solely by the insertion motion performed by the user.

If in accordance with another embodiment a second energy storage device is connected to the closing device, and if the card reader is otherwise designed as specified in claim 9, then it is ensured that the closing motion of the closing device proceeds with the aid of the energy stored in the second energy storage device,

DETAILED DESCRIPTION OF THE PREFERRED EMBODIMENTS OF THE INVENTION

A card reader according to the invention will be explained in more detail based on the figures.

Figure 1:
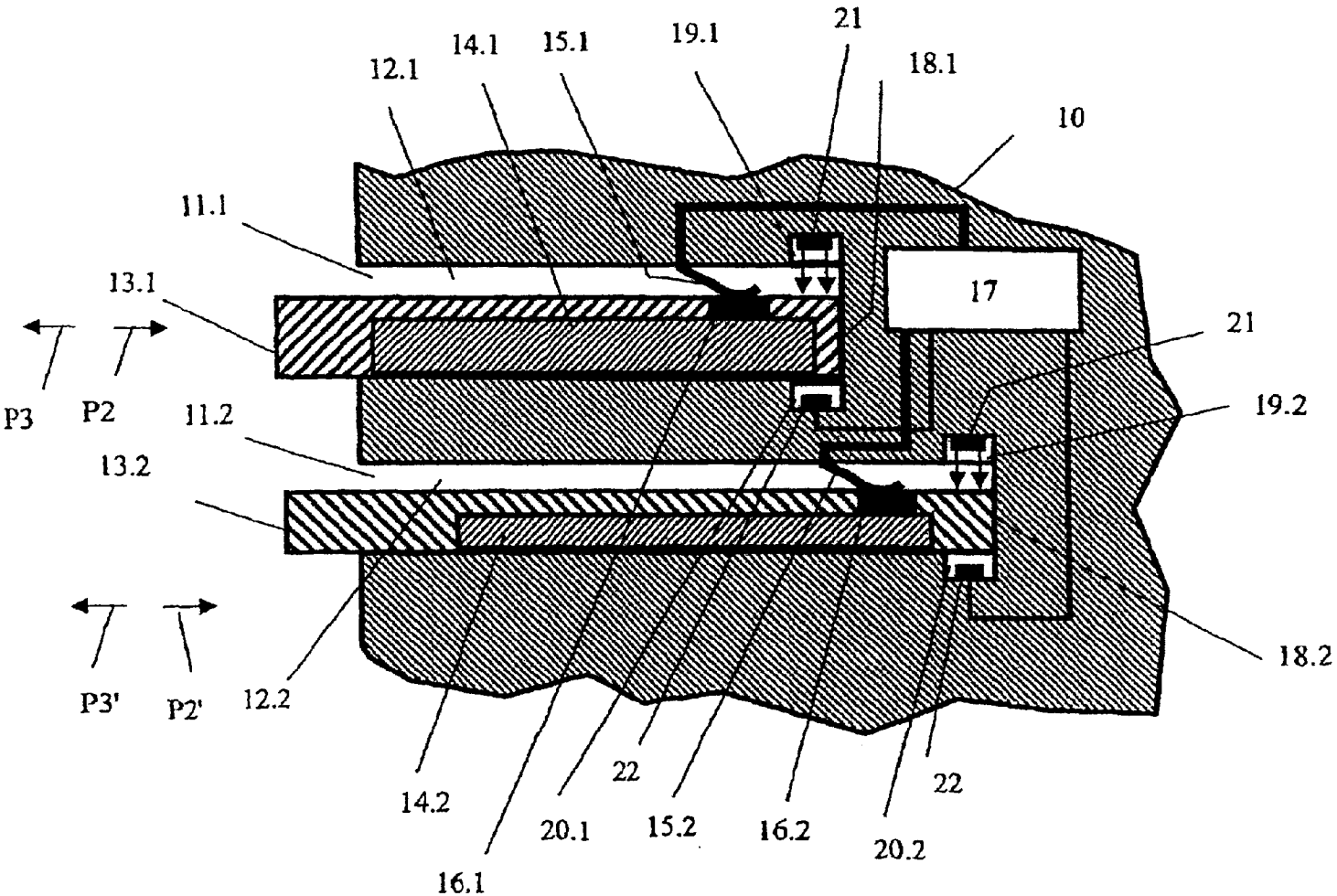
FIG. 1 Cross-section of a card reader.

FIG. 1 shows part of a housing shell 10 that contains two insertion apertures 11.1 and 11.2. There is a slot 12.1. and 12.2 behind each of the two insertion apertures 11.1, 11.2.

A card 13.1 equipped wish memory 14.1 is inserted in the first slot 12.1. In addition, there are spring contacts 15.1 in slot 12.1 that make contact with the contact surfaces 16.1 connected to the memory 14.1 of a card 13.1 inserted in the slot 12.1.

There is also a card 13.2 inserted in the second slot 12.2. As this card 13.2 is a SIM card needed to establish and maintain a mobile telephone connection, this card 13.2 is also equipped with memory 14.2. There are also spring contacts 15.2 mounted in the slot 12.2 that make physical contact with the contact surfaces connected to this cards memory 14.2 when there is a card 13.2 inserted in this slot 12.2.

Each contact spring 15 located in a slot 12.1, 12.2 is connected to a read and/or write device 17. The read and/or write device is used to read and/or write information from and/or to the memory 14.1 and 14.2.

In addition, there are two pockets 19.1, 19.2, 20.1, 20.2 on the end 18.1, 18.2 of each slot 12.1, 12.2 that are used to mount a monitoring device. In particular, this is realized in this example in that there is a light source 21 in each pocket 19 and a light-sensitive sensor 22 in each pocket 20, where each of the sensors 22 is connected to the read and/or write device 17.

This monitoring device has the task of monitoring the slots 12 with cards 13 to determine if the slots contain cards and to control the login or logout procedure of the cards 13. A login procedure is understood to be a procedure in which the memory 14 of a card 13 exchanges data with the read and/or write device 17 through the connection of the contact springs 15 with contact surfaces, while a logout procedure terminates the previously existing data exchange between a memory 14 and the read and/or write device 17 by disconnecting the existing connection.

If neither of the slots 12 in a device shown in FIG. 1 contains a card 13 and a card 13.2 is then inserted in the slot 12.2 in the direction of the arrow P2', then this card 13.2 is logged in and the light beam located at the end 18.2 of this slot 12.2 is interrupted once the card 13.2, as shown in FIG. 1, has reached its end position in the slot 12.2. The contact springs 15.1 in the slot 12.1 are electrically disconnected from the read and/or write device 17 at the same time as the light beam in the slot 12.2 is interrupted so that a card 13.1 inserted afterwards in the slot 12.1 in the direction of the arrow P2 cannot exchange data anymore with the read and/or write device 17.

If the two slots 12 contain cards 13 as shown in FIG. 1, then the light beam present in the slot 12.1 that is interrupted by the inserted card 13.1 has the task of constantly checking the position and presence of the card 13.1. If the card 13.1 is now suddenly pulled out of the slot 12.1 in the direction of the arrow P3, then the sensor 22 located in the pocket 20.1 detects this and informs the read/write device 17 of this, whereupon the card 13.2 located in the slot 12.2 is immediately logged out. To ensure that the card 13.2 located in the slot 12.2 is logged out soon enough before the card 13.1 moving out of slot 12.1 is logged out, the contact surfaces 16.1 are to be designed to be large enough so that physical contact with the contact springs 15.1 is only broken after the light beam in the slot 12.1 is not interrupted anymore and the card 13.2 is logged off.

Just for the sake of completeness we would like to point out that the monitoring device is not limited to the design shown in the context of FIG. 1 as long as the sensor/sensors used ensure that a card 13.1 in the slot 12.1 cannot be logged in a when there is a card 13.2 already logged in in the slot 12.2 and that when there are two cards 13.1, 13.2 logged in, the first card 13.2 is always logged out before the card 13.1 located in the slot 12.1 is logged out.

In this manner, another example (not shown) can be demonstrated in which the light beam found at the end 18.2 of the slot 12.2 in accordance with FIG. 1 is not needed when the read and/or write device 17 is modified so that after a login procedure of a card 13.2 or after the electrical contact between the memory 14.2 and the read and/or writing device 17 is made, the device detects the presence of a card 13.2 and disconnects the connection to contact spring 15.1 when the light beam in the slot 12.1 is interrupted by a card 13.1.

Figure 2:
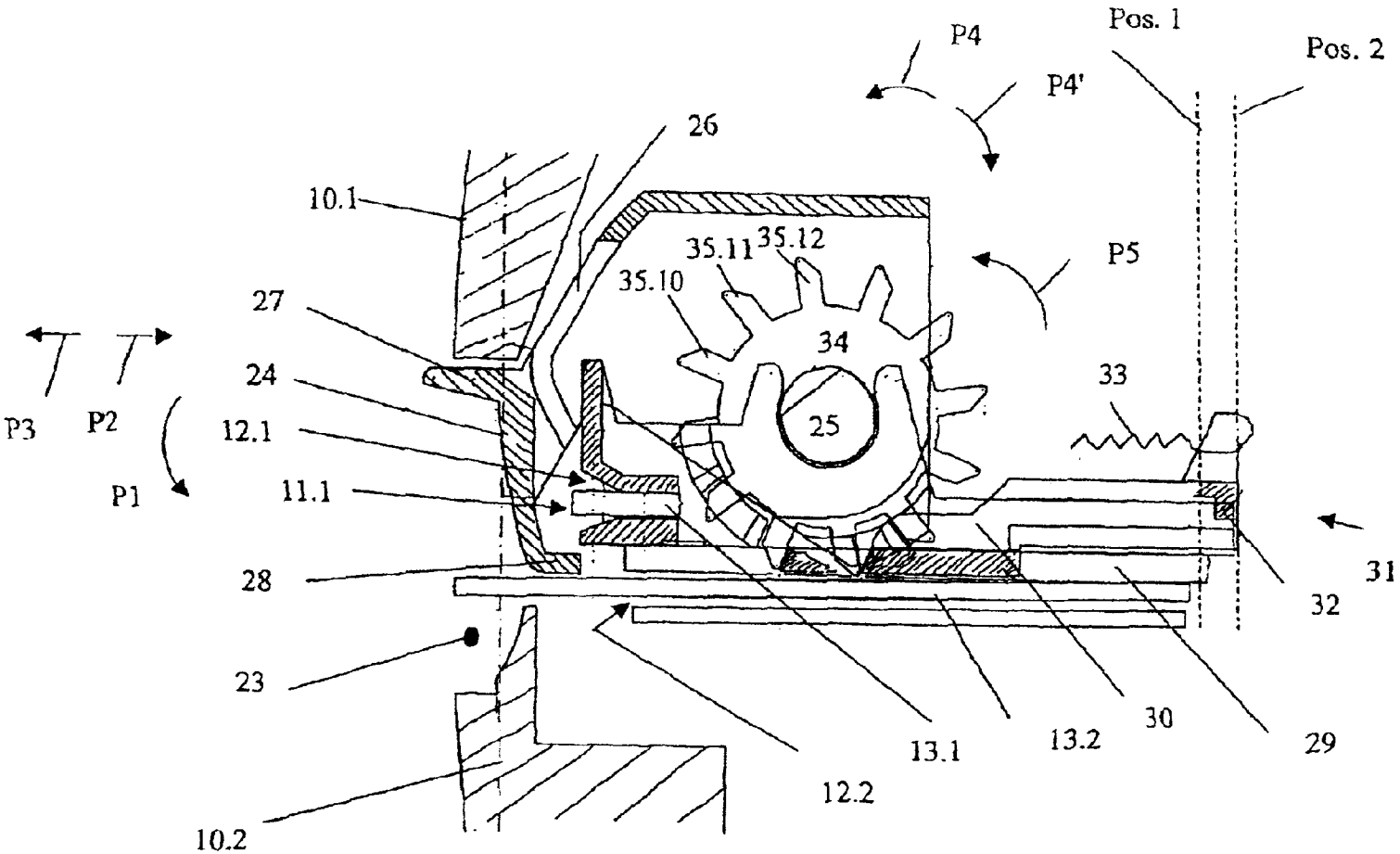
FIG. 2 Cross-section of another card reader.

FIG. 2 shows a mechanical implementation that prevents a card 13.1 from being logged on by inserting a card 13.1 in the slot 12.1 when there is already a card 13.2 located in the slot 12.2, and that prevents a card 13.1 located in and logged in using slot 12.1 from being logged out by pulling it out of slot 12.1 before card 13.2 located in and logged in using slot 12.2 is logged out.

The cross-sectional diagram in FIG. 2 shows a housing shell 10.1, 10.2 that has an opening 23. The two slots 12.1 and 12.2 are located behind the opening 23 (in the interior of the housing) one over the other, where slot 12.1 contains card 13.1 and slot 12.2 contains card 13.2. For the sake of clarity, FIG. 2 does not contain representations of the memory in the cards, the contact surfaces and the spring contacts.

In addition, FIG. 2 also shows a closing device. This closing device is formed mainly by a cover 24 whose side panels 24' are mounted on a shaft 25 and that can be rotated in the direction of the arrow P4,P4' (see also FIG. 3 for their mounting position). The cover 24 also has a cut-out 26, a handle 27 and a stop base 28. If, as shown in FIG. 2, the card 13.2 is inserted in slot 12.2 and the handle 27 is seated against the housing shell 10.1, then the cover 24 and the card 13.2 block the opening 23. Because the stop base 28 of the cover 24 is seated against the card 13.2, as can clearly be seen in the diagram in FIG. 2, any motion of the cover 24 in the direction of the arrow P4, P4' is prevented by the stop base 28 and the handle 27. As the cover 24 also blocks the insertion aperture 11.1 of the slot 12.1 at the same time, a card 13.1 located in the slot 12.1 cannot be removed from the slot 12 1. However, if a card 13.1 located in slot 12.1 is to be removed from this slot, the card 13.2 located in slot 12.2 must first be completely removed. This must be preceded by the logging out of the card 13.2 as already described above.

If the card 13.2 is pulled out of slot 12.2, then there is no contact surface anymore for the stop base 28 so that the cover 24 can be moved downward in the direction of the arrow P1 (P4) until the handle 27 is seated against the housing shell 10.2. If the handle 27 has made contact with the housing shell 10.2, then the cut-out 26 in the cover 24 allows access to the insertion aperture 11.1 and the card 13.1 can be removed from the slot 12.1 (see also FIG. 8e).

The design shown in FIG. 2 also prevents a card 13.1 from being inserted in slot 12.1 after a card 13.2 has been inserted into and logged in using slot 12.2. This is due to the fact that the handle 27 of the cover 24 (as shown in FIG. 2) is seated against the housing shell 10.1 while blocking the insertion aperture 11.1 of slot 12.1 at the same time when a card 13.2 has been inserted or logged in.

The following contains a detailed description of an ejection device for a card 13.1 located in slot 12.1.

As can be seen in FIG. 2, the slot 12.1 is formed by a fixed surface 29 and a cradle 30 for this purpose. The cradle 30 is connected to the fixed surface 29 and can be slid in the direction of ejection and of insertion (P2, P3) of the card 13.1. There is also a stop 32 at the end 31 of the cradle 30 that is seated against the card 13.1 inserted in slot 12.1 when it has reached its end position in slot 12.1. In addition there is a mechanical energy storage device in the form of a spring 33 located between the cradle 30 and the fixed surface (not shown in its entirety in FIG. 2). Finally, there is a gear 34 on shaft 25 that, together with the shaft 25, can only be rotated in a counterclockwise direction P5.

We would like to point out at this point that the teeth 35 of the gear 34 that have an even-numbered ordinal number (35.2, 35.4, 35.6, . . . ) are wider in the direction the shaft axis than the teeth 35 that have an odd-numbered ordinal number (35.1, 35.3, 35.5, . . . ) and that there is a tooth 35 with an odd-numbered ordinal number (35.1, 35.3, 35.5, . . . ) located between each pair of teeth 35 with an even-numbered ordinal number (35.2, 35.4, 36.6, . . . ).

It can clearly be seen in FIGS. 3 through 6, which all show a bottom view of the cradle 30 when looking up from point B in FIG. 2, that the gear 34 is located on a side next to the cradle 30, that the teeth 35 with odd-numbered ordinal numbers (35.1, 35.3, 35.5, . . . ) are not as wide (in the direction of the cradle 30) as the teeth 34 with even-numbered ordinal numbers (35.2, 35.4, 35.6, . . . ) and that there is a cam 36 on the cradle 30 that extends in the direction of the gear 34 whose front edge 37 is designed to make physical contact with the teeth 35 with even-numbered ordinal numbers (35.2, 35.4, 36.6, . . . ) and whose longitudinal edge 38 always remains a short distance from the teeth 35 with odd-numbered ordinal numbers (35.1, 35.3, 35.5, . . . ).

Figure 3:
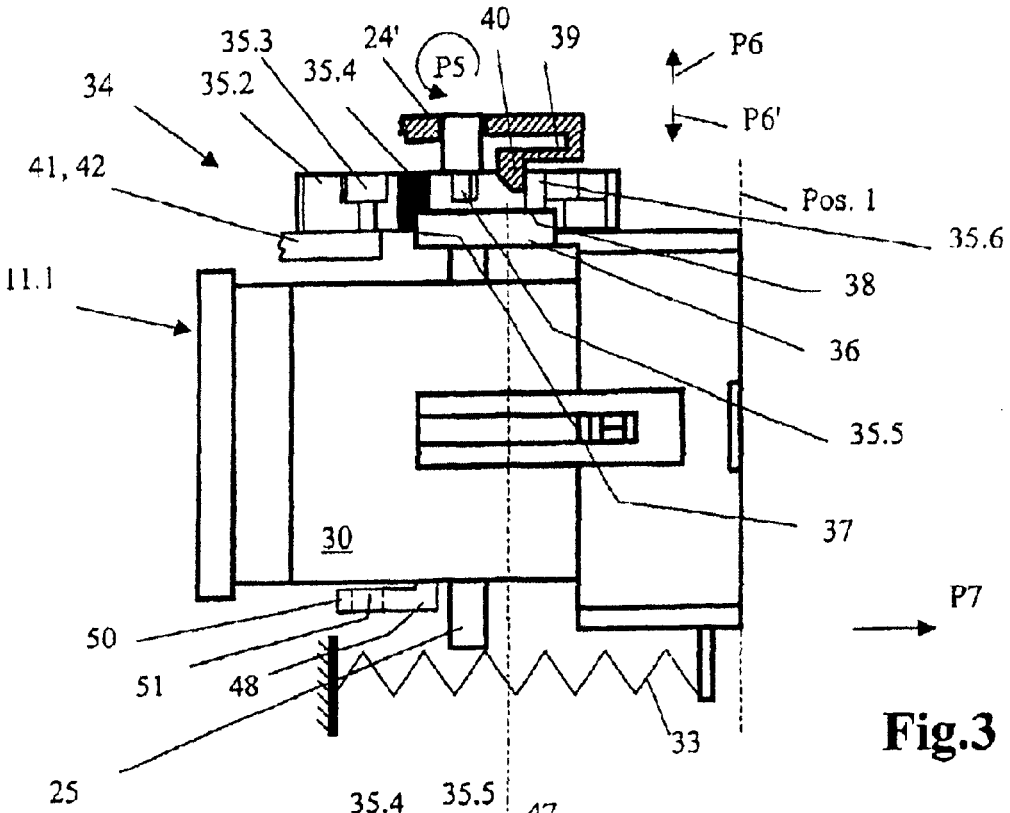
FIG. 3 Bottom view of a cradle.

FIG. 3 shows a state in which the cover 24 is closed (as shown in FIG. 2) and in which the slot 12.1 does not contain a card 13.1. In this state the insertion aperture 11.1 is in the position Pos.1, which is not only shown in FIG. 3 as a dotted line but is also shown as such in FIGS. 2 and 6. In addition, it can be seen in the diagram in FIG. 3 that there is a tongue 39 on the cover 24, on the end of which there is a lug 40 that extends into the space between two teeth 35 (35.5, 35.6) of gear 34.

There are also two fixed ramps 41, 42 located on the side of the gear 34 that faces the cradle 30. The ramps are only shown schematically in FIGS. 3 through 6 and will be described in more detail in the context of FIGS. 7a through c. The diagram in FIG. 7a refers to the situation that is also shown in FIG. 3. It can clearly be seen in the diagram according to FIG. 7a that there are two ramps 41, 42 arranged one behind the other in the direction of rotation P5 of the shaft 25, whereby the steep falling edge 43.1 of ramp 41 and the base point F2 of the incline 44.2 of ramp 42 are separated by an intermediate area 45. It can also be seen in FIGS. 7a through c that the ramp 42 has a flat area 46 that primarily runs parallel to the intermediate area 45.

Figure 7A:
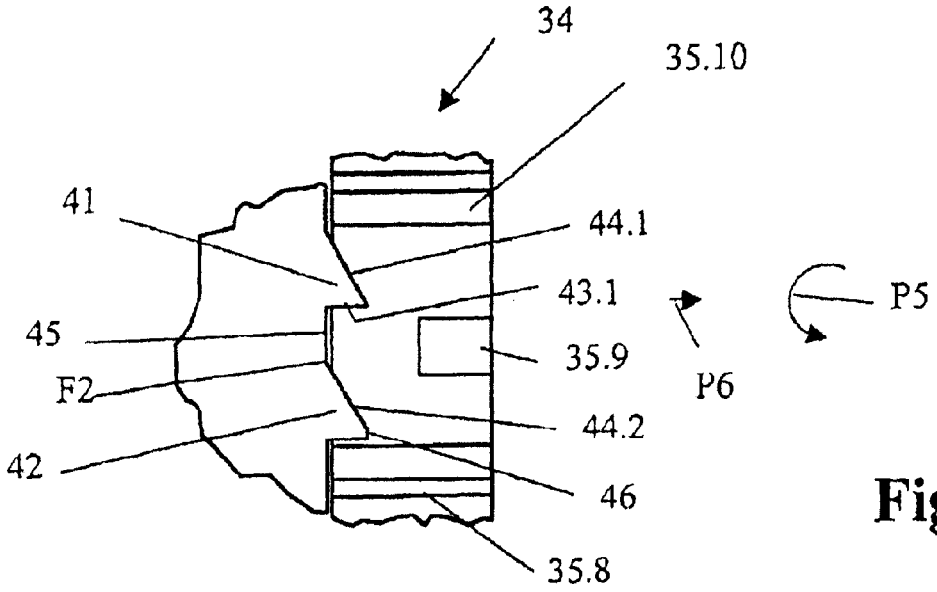
FIGS. 7a–c Three diagrams of two fixed ramps.

If the situation shown in FIG. 3 arises, then, as shown FIG. 7a, the two ramps 41, 42 lie exactly between two even-numbered teeth 35.8, 35.10 of gear 34, while the odd-numbered tooth 35.9 located between the two even-numbered teeth 35.8, 35.10 is located directly across from the intermediate area 45.

If, based on the situation shown in FIG. 3, the cover 24 is now opened in the direction corresponding to the direction of the arrows P1, P4 shown in FIG. 2, then this opening motion will be transferred to the lug 40. However, as the right side of lug 40 (as shown in FIG. 3) is seated against a tooth 35 with an even-numbered ordinal number 35.6 at this time, the opening motion will be transferred to the gear 35, rotating the gear together with the shaft 25 in the direction of the arrow P5 until the gear 34 reaches the position shown in FIG. 4.

Figure 4:
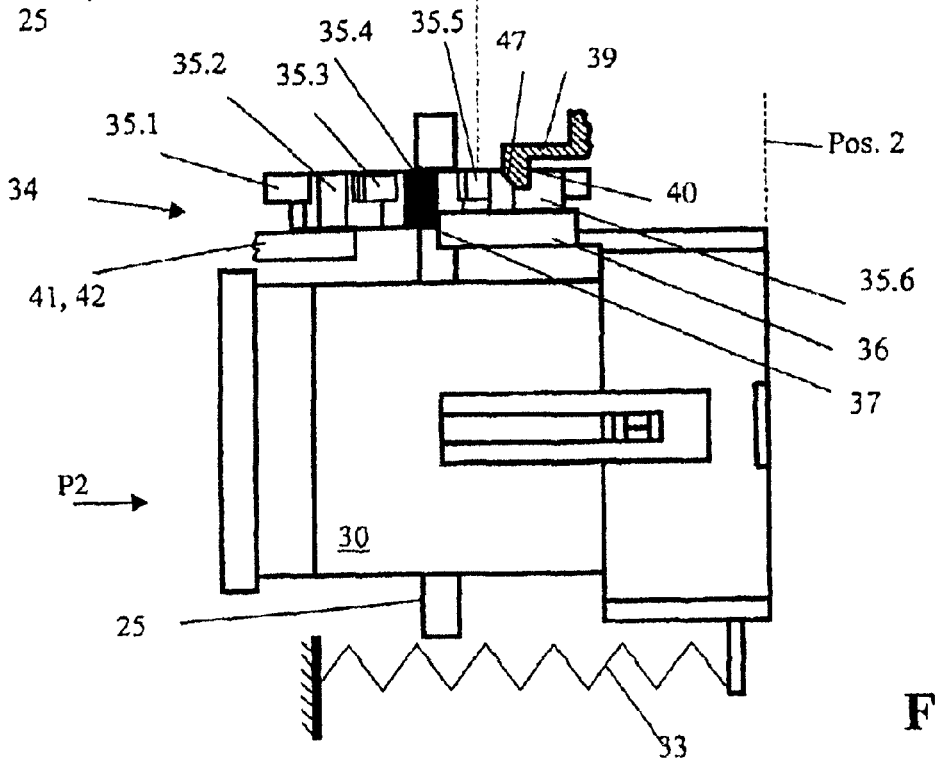
FIG. 4 Another diagram according to FIG. 3.

At the same time the gear 34 is rotating, the even-numbered tooth 35.4 (which is shown entirely in black in FIGS. 3 through 6 to improve recognition of the tooth) makes contact with the front edge 37 of the cam 36 and pushes the cam 36 together with the cradle 30 in the direction P7 to the position designated in FIG. 4 by Pos.2. The spring 33 is loaded while the cradle 30 moves from Pos.1 to Pos.2.

Figure 7B:
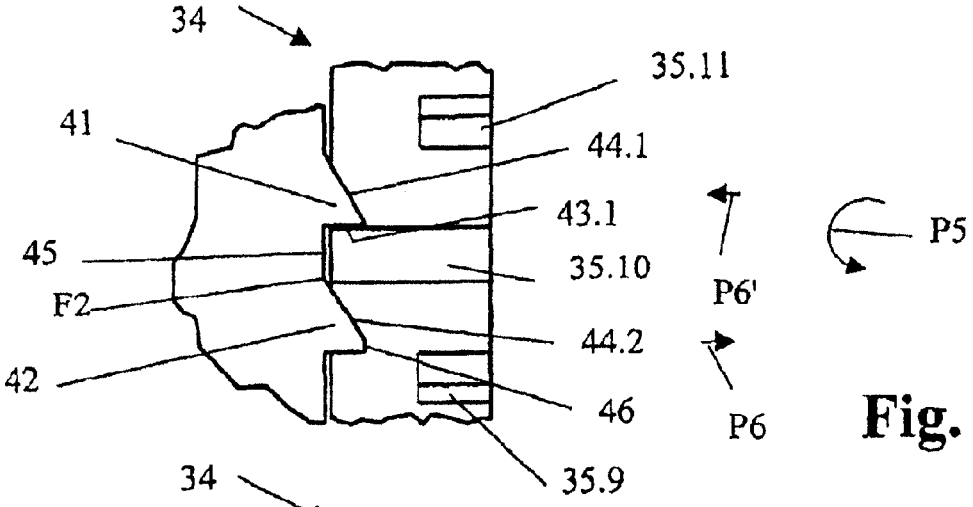

In addition, the shaft 25 and the gear 34 can be moved in the direction (P6, P6') of the shaft axis. The mobility of the gear 34 and the shaft 25 ensures that the rotation P5 of the gear 34 is not impeded by the ramps 41, 42, and, based on the position shown in FIG. 7a, that the even-numbered tooth 35.10 of the gear 34 can slide along the incline 44.1 of ramp 41 when the gear 34 and the shaft 25 are moved in the direction P6 at the same time. At the same time the rotational motion P5 ends, the even-numbered tooth 35.10 of gear 34 meshes with the intermediate area 45 while the motion of the gear 34 and the shaft 25 in the direction P6' is being completed so that the even-numbered tooth is then seated against the steep falling edge 43.1 of ramp 41 with one of its sides (FIG. 7b). The meshing of the tooth with the intermediate area 45 is aided in that the motion of the gear 34 and the shaft 25 in the direction P6 of the shaft axis is performed while working against a spring force during the sliding phase of the even-numbered tooth 35.10 along the incline 44.1. This spring force is provided by the tongue 39 (FIG. 3) in our example, which is also bent back in the direction P6 of the shaft axis as the even-numbered tooth slides along the incline 44.1.

If a situation in accordance with FIGS. 4 and 7b arises after the cover 24 has been opened (FIGS. 2 and 3), then the spring 33 is loaded and the cradle 30 moves to its position Pos.2. In addition, the even-numbered tooth 35.4, which is shown in black FIGS, 3 through 6 to improve its visibility in the diagrams and which has moved the cam 36 and the cradle 30 to the position Pos.2 due to the rotation P5, is vertical after the rotation P5 (FIG. 4). Even when the spring 33 is loaded in the position Pos.2, there is no danger that the gear 34 will rotate in the opposite direction of rotation P5 after the cover 24 has been completely opened (FIG. 2) as no force acts in the direction of the arrow P1. This is due to the fact that when the cover 24 has been completely opened, thereby rotating the gear 34, the even-numbered tooth 35.10 is guided over the ramp 41 and once the opening motion has been completed one of its sides is seated against the steep falling edge 43.1 of ramp 41, which prevents the rotation against the direction of rotation P5 (FIG. 7b).

Figure 5:
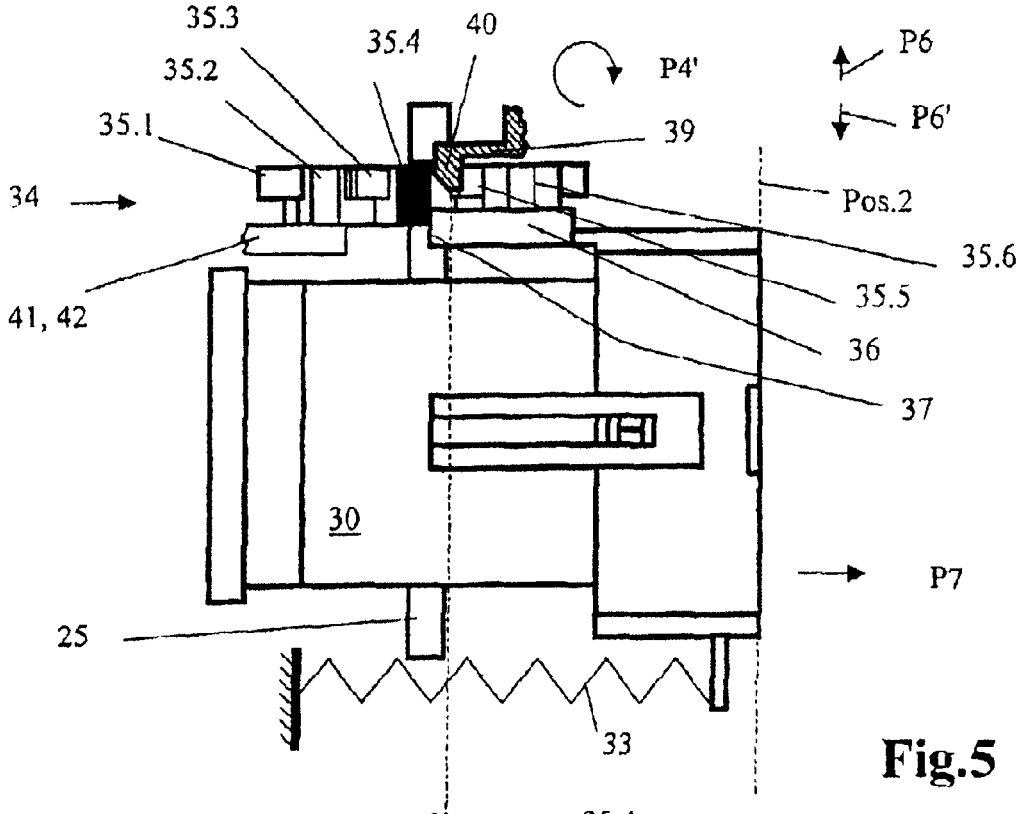
FIG. 5 Another diagram according to FIG. 3.

When the position Pos.2 is reached as shown in FIG. 4, then a card 13.1 can be inserted in the slot 12.1 through the cut-out 26 in the cover 24 (FIG. 2). The insertion of a card is indicated in FIG. 4 by the arrow P2. If the card 13.1 inserted in the slot 12.1 makes physical contact with the stop 32, then it has reached its end position in the slot 12.1 (FIG. 2) and the cover 24 can be closed again. The cover 24 is closed by moving the handle 27 upwards in the opposite direction of the arrow P1 until it makes contact again with the housing shell 10.1. The tongue 39, together with the lug 40, are rotated in the opposite direction of the arrow P5 when the closing motion is carried out (FIG. 5). This relationship is indicated in FIG. 2 by the arrow P4'.

As already explained in the context of FIGS. 7a and b, because the tongue 39 can move in the direction P6 and the lug 40 also has a bevel 47 on the side facing away from the direction of rotation P5 of gear 34, the bevel 47 comes into physical contact with an odd-numbered tooth 35.5 (FIG. 4) of the gear 34 during the closing motion, thereby bending the tongue 39 slightly in the direction P6 due to the resulting sliding of the tooth along the bevel 47. At the same time as the closing motion is completed, the lug 40 snaps into place in a space between an even-numbered tooth 35.4 and an odd-numbered tooth 35.5 of the gear 34, whereby the side of the lug 40 on which the bevel 47 is located faces the tooth 35 with the even-numbered ordinal number 35.4. This relationship is shown in detail in FIG. 5.

If the card 13.1 inserted in slot 12.1 is now to be removed, the user only needs to open the cover 24 in the direction of the arrow P1 (FIG. 2). As already explained above, a card 13.2 that was inserted in slot 12.2 must be removed first so that the motion in the direction of the arrow P1 is not impeded by the card 13.2.

If the renewed opening motion is performed in the direction of the arrow P1; P4, then this motion is transferred again via the tongue 39 and the lug 40 to the gear 34 and the shaft 25, where, based on FIG. 5, the latter two components 25, 34 rotate in the direction of the arrow P5. The cam 36, together with the cradle 30, are also moved slightly in the direction of the arrow P7 by the new rotation P5 of the shaft 25 and gear 34 due to the physical contact existing between the even-numbered tooth 35.4 (shown in black to improve the clarity of the diagram) of the gear 34 and the front edge 37 of the cam 36. In this respect the same basic principles also apply here that were discussed above in the context of FIG. 3. As the situation shown in FIG. 7b has not changed after reaching the position shown in FIG. 5, the even-numbered tooth 35.10 located in the intermediate area 45 as shown in FIG. 7b slides over the incline 44.2 of ramp 42 due to the renewed opening motion P1 and the resulting rotation of gear 34 in the direction of the arrow P5. The gear 34 and the shaft 25 are moved slightly in the direction P6 at the same time as the face of the even-numbered tooth 35.10 slides along the incline 44.2. At some point in time the even-numbered gear 35.4 (shown in black to improve the clarity of the diagram) will not be in physical contact with the cam 36 anymore due to the renewed opening motion P1 and due to the motions in the direction P6 and P7. This state is primarily reached when, based on FIG. 7b, the front of the even-numbered gear 35.10 has reached the flat area 46 present on the ramp 42 due to the rotation P5. This lack of physical contact between the cam 36 and even-numbered gear 35.4 (shown in black to improve the clarity of the diagram) allows the spring 33 to contract again, which simultaneously moves the cradle 30 in the opposite direction of the arrow P7 back to the position Pos.1 shown in FIG. 6. Because a card 13.1 located in the slot 12.1 is seated against the stop 32 of the cradle 30 (FIG. 2) when the cradle 30 is in the position Pos.2, moving the cradle 30 to the position Pos.1 will push the inserted card 13.1 a little bit out of the insertion aperture 11.1, where it can be easily grabbed to remove it completely.

Figure 6:
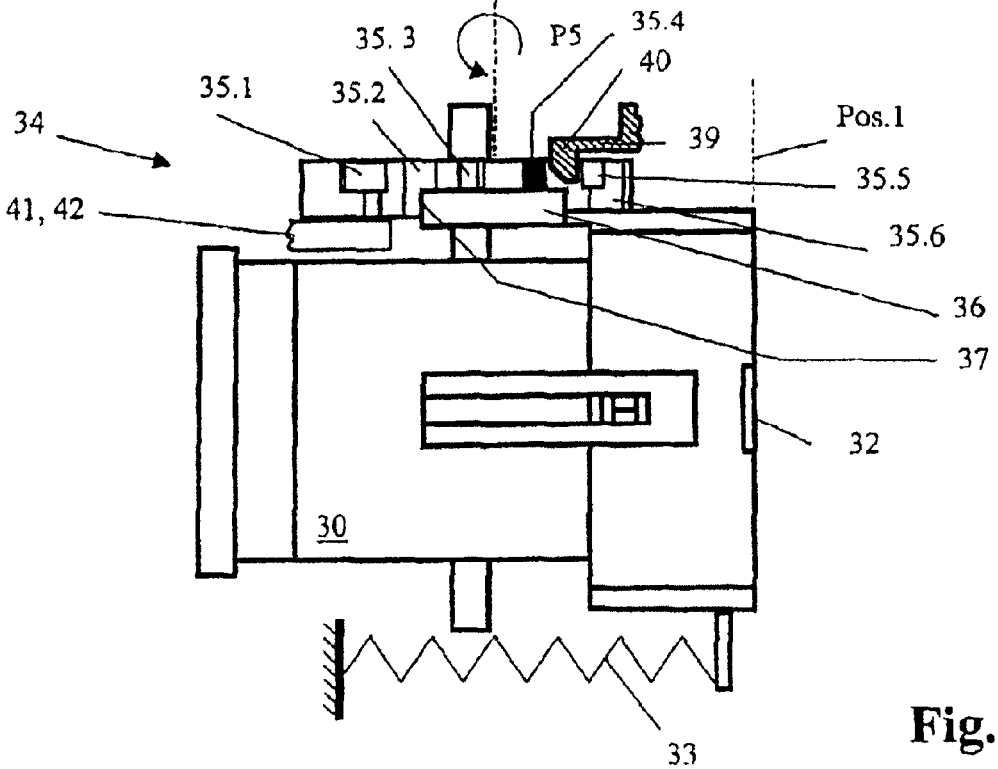
FIG. 6 Another diagram according lo FIG. 3.
Figure 7C:
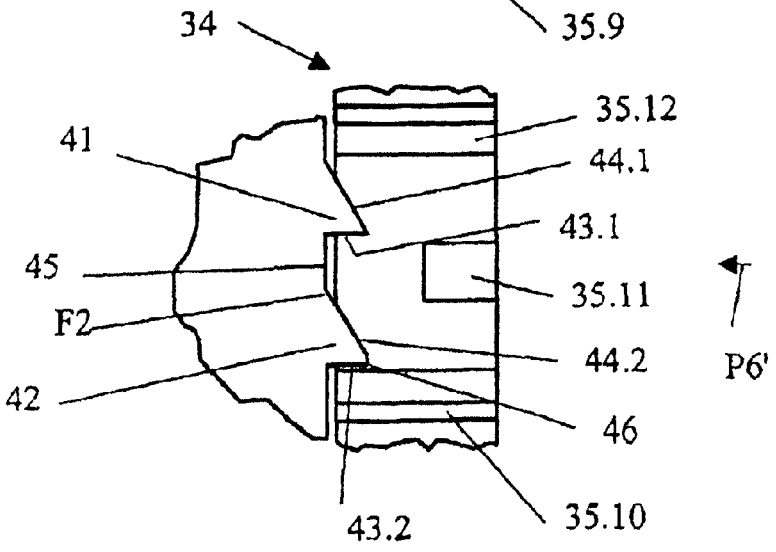

Just for the sake of completeness we would like to point out that once the position Pos.1 shown in FIG. 6 has been reached, the even-numbered tooth 35.10, which was located between the two ramps 41, 42 before the renewed opening motion P1 was performed (see FIG. 7b), is pressed again in the direction P6' after passing over the flat area 46 due to the spring action of the tongue 39 already explained above so that a situation arises at the end the rotational motion P5 that corresponds to the situation shown in FIG. 7c.

If the card 13.1 has been completely removed, then the resulting state corresponds to that shown in FIG. 3 when the cover 24 is closed again by a closing motion in the opposite direction of the arrow P1 (FIG. 2) or by a rotation P4' corresponding to the explanation stated in the context of FIG. 5. However, the lug 40 snaps into place in the space between the even-numbered tooth 35.4 and the odd-numbered tooth 35.3 of gear 35 after the rotational motion P4' has been completed, The opening and closing of the cover 24 will be explained in more detail in the following.

The cradle 30 is equipped with a sliding tongue 48 (which is only shown in FIG. 3 to improve the clarity of the diagrams in FIGS. 3 through 6) to make it easier to close the cover 24. This sliding tongue 48 has a hook 50 and a pocket 51 on its free end 49 (FIGS. 8a through 8e). In addition, the cover 24 and the side panels 24' can be seen in the schematic diagrams in FIGS. 8a through 8e.

Figure 8A:
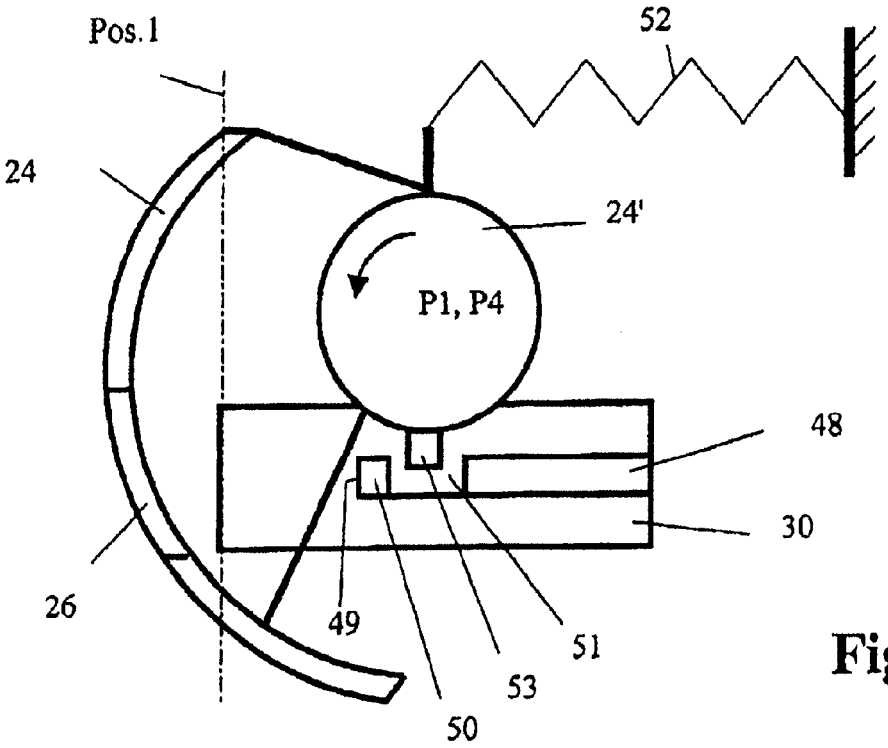
FIGS. 8a–e Five schematic diagrams of a cradle with cover.

In the situation shown in FIG. 8a the cradle 30 is located in the position Pos.1, which is also shown in FIG. 3. Additionally, the cover 24 has been opened by a motion P1, P4. The latter is indicated in that the cut-out 26 of the cover 24 is in front of the cradle 30, thereby allowing access to the insertion aperture 11.1. The spring 52 that forms a second energy storage device is connected to the cover 24 and has also been loaded by the opening motion P1, P4. If no more of the force used to trigger the opening motion P1, P4 is applied, then the cover 24 a rotates in the direction P4' (FIG. 8b), whereby the energy for the rotational motion in the direction P4' is supplied by the spring 52 just loaded. It can clearly be seen in the diagram shown in FIG. 8b that the cover 24 blocks the insertion aperture 11.1 again after the rotational motion in the direction P4' has been completed because the cut-out 26 has now been rotated upwards.

As can be seen in FIGS. 8a through 8e, there is a pin 53 on the side panel 24' of the cover 24 that projects slightly into the pocket 51 when in the position shown in FIG. 8a. As the diagrams in FIGS. 8a through 8e clearly show that the pocket 51 is wider than the pin 53, then the rotational motion P4' induced by the spring 52 will not be hindered by the hook 50 when the cradle 30 is located in the position Pos.1 when no more force is applied in the direction P1, P4.

Figure 8B:
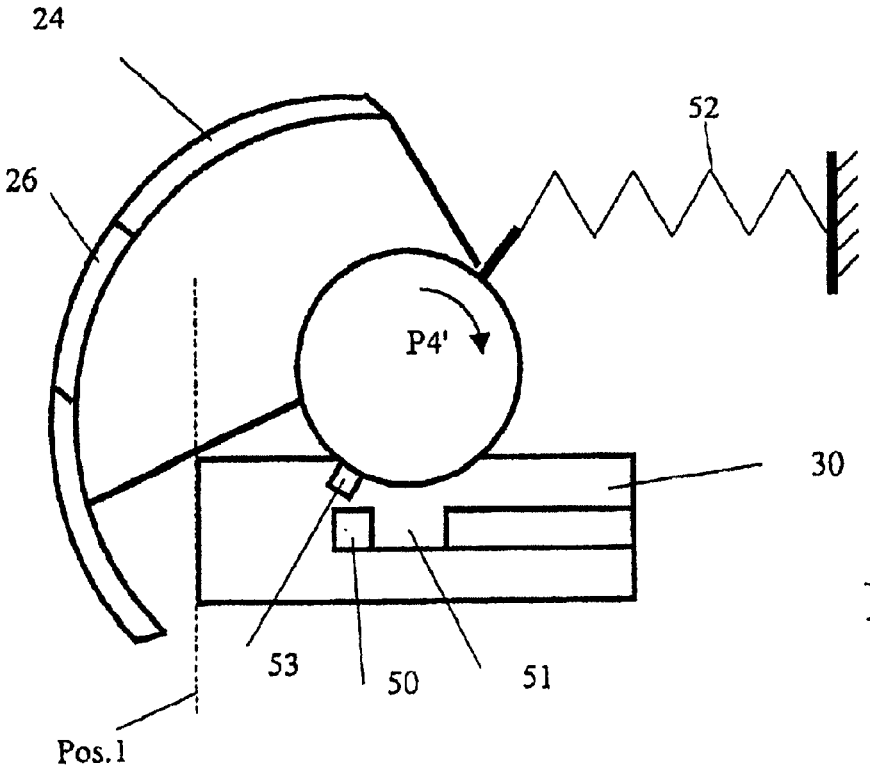
Figure 8C:
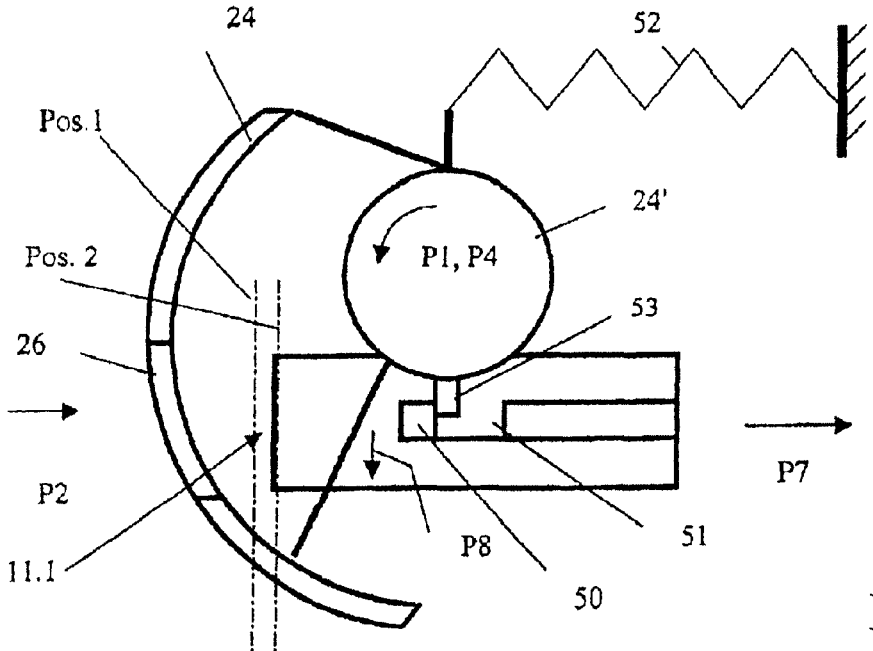

Based on FIG. 8b, if the cover 24 is opened again to insert a card 13.1 (not shown in FIG. 8b) by moving it in the direction P1, P4 and the cut-out 26 is rotated until it is in front of the insertion aperture 11.1, then, as already explained in the context of FIGS. 3 and 4, the cradle 30 is moved in the direction P7 to its position Pos.2. While the cradle 30 is in motion, pin 53 moves in the direction of the arrow P1, P4. However, as the cradle 30 moves away from pin 53 while being moved to the position Pos.2, pin 53 cannot take its position within the pocket 51 without meeting resistance. To be more precise, when the pin 53 makes contact with the hook 50 that prevents free motion during the rotational motion P1, P4 and the motion of the cradle 30 in the direction P7, the hook 50 is pushed away by pin 53 in the direction P8. If the rotational motion P1, P4 is complete, the spring 52 is loaded and the cover 24 is open, then the pin 53 is seated against the hook 50 as shown in FIG. 8c, whereby a rotational motion in the opposite direction of the arrow P1 or in the direction of the arrow P4' is prevented in spite of the force exerted by the loaded spring 52. This state can be used to insert a card 13.1 (not shown in FIG. 8c) in the insertion aperture 11.1 (indicated by the arrow P2).

If the card 13.1 is inserted in the direction P2, then the cover 24 can be closed by moving it in the direction P4', whereby the course of events already explained in the context of FIG. 5 is takes place at the same time. As a closing motion P4' performed in accordance with FIG. 8c does not lead to any change in the position of the cradle 30, the hook 50 is deflected in the direction P8 by the force of the pin 53 acting in the direction P4', so that, once the resistance of the hook 51 is overcome by pin 53, the spring 52 finishes the closing motion in the direction P4'. The cover 24 then reaches the position shown in FIG. 8d.

Figure 8D:
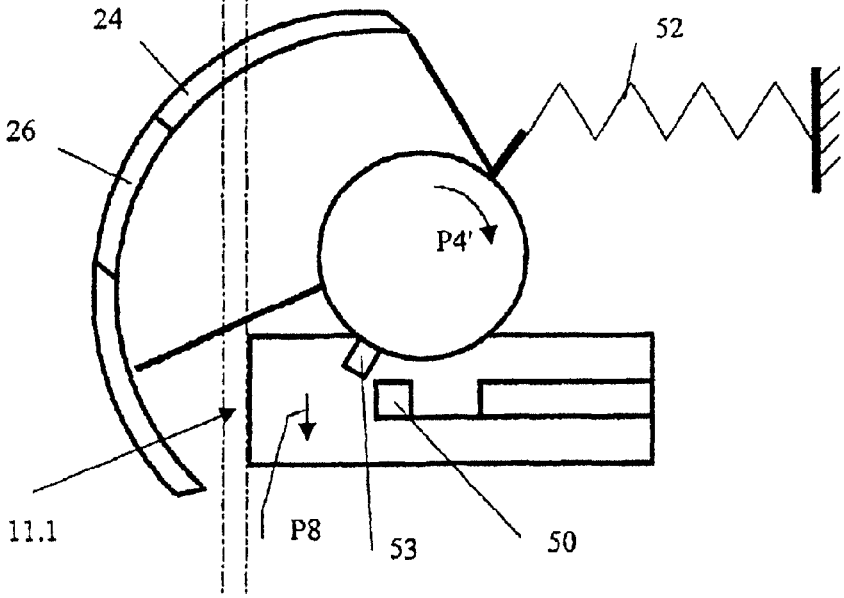
Figure 8E:
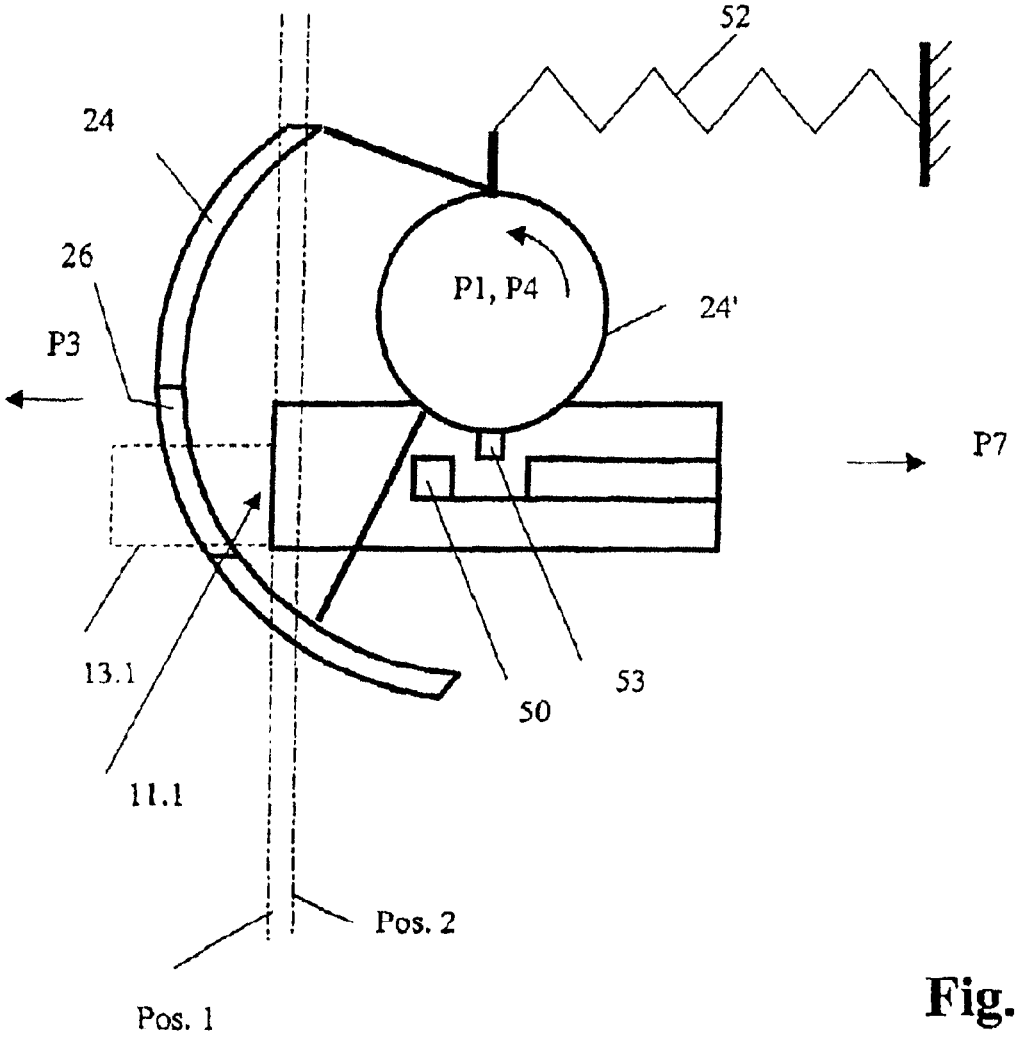

If the cover 24 is now opened again starting at the position shown in FIG. 8d by moving the cover in the direction P1, P4, then, as explained in the context of FIG. 6, the cradle 30 is moved from the position Pos.2 back to Pos.1 and the card 13.1 is pushed out of the insertion aperture 11.1. The unhindered mobility of the cradle 30 required to eject the card 13.1 is not impaired by the pin 53 and the hook 50 as the device is synchronized so that the cam 36 (FIGS. 3 through 6) is not hindered by a tooth 35 with an even-numbered ordinal number 35.4 anymore (see the explanation for FIG. 6) once the pin 53 has already overcome the resistance of the hook 50 during the rotation in the direction P5. If the opening motion in the direction of the arrow P5 has been completed, then the result is the situation shown in FIG. 8e. It can clearly be seen in this diagram that the card 13.1 (indicated in FIG. 8e by the dotted lines) is pushed out of the insertion aperture 11.1 and the cut-out 26 due to the motion of the cradle 30 to the position Pos.1. If the card 13.1 projects out of the cut-out 26 after the opening motion P1, P4 is complete, then a closing motion corresponding to the principles shown in FIG. 8b is prevented in spite of the cradle 30 being in the position shown in FIG. 8a. On the contrary, the closing motion in the direction P4' (according to FIG. 8b) will only be carried out when the situation shown in FIG. 8a is reached again after reaching the position shown in FIG. 8e and the complete removal of the card 13.1 from the insertion aperture 11.1 and cut-out 26 because the spring 52, which supplied the energy required for the closing motion, can only contract after this point in time.

Just for the sake of completeness we would like to point out that the hook 50 and the pin 53 are shown in FIGS. 8a through 8e for the sake of clarity without the bevels and/or inclines that facilitate proper interaction between them.

What is claimed is:

1. A card reader comprising a first slot containing an insertion aperture for inserting a card equipped with a memory;

a second slot also containing an insertion aperture for inserting another card equipped with memory; and a monitoring device that prevents the logging on of a second card inserted in said second slot when said first slot already has a first card inserted in said first slot that, when said second card has been inserted *in* said second slot, monitors said second card's position in said second slot and logs off the first card located in said first slot when said first card's position changes.

2. The card reader according to claim 1 such that:

said first slot and said second slot are arranged one over the other, whereby the insertion apertures of said first slot and said second slot point in the same direction.

3. The card reader according to claim 1 further comprising a closing device that is a moveable cover equipped with a stop base that exposes the insertion aperture of said second slot when in said cover's first position and that blocks said insertion aperture when in said cover's second position, whereby the stop base is seated against said first card located in said first slot to prevent the cover from moving when said first card has been inserted in said first slot.

4. The card reader according to claim 1 further comprising an ejection device [on] *of* said second slot that ejects said second card inserted in said second slot from the insertion aperture when a closing device allows access to the insertion device [on] *of* said second slot.

5. The card reader according to claim 4 such that:

said ejection device is formed by a mechanism that supplies the mechanical energy required to eject said second card inserted in said second slot [on] after [closing and/or] opening said closing device.

6. The card reader according to claim 5 such that:

said ejection device has a cradle that moves in the direction of insertion and of ejection of the second card insertable in the second slot;

a gear located on a rotatable shaft that can be slid in the direction of the shaft axis whose teeth with even numbered ordinal numbers are wider in the direction of the shaft axis [that] *than* the teeth with odd-numbered ordinal numbers;

a cam connected to the cradle whose front edge makes physical contact with the teeth with even-numbered ordinal numbers and whose longitudinal edge always remains a shorter distance from the teeth with odd-numbered ordinal numbers;

a tongue connected to said closing device that can be moved not only in the direction of the shaft axis, but also in the direction of rotation of the shaft and that has a lug on its free end to mesh in the space between an even and an odd-numbered tooth of the gear;

two stationary ramps located one behind the other in the direction of rotation of the shaft that are periodically in physical contact with the front surface of the teeth with even numbered ordinal numbers and that has a first energy storage device connected to the cradle.

7. The card reader according to claim 6 further comprising a second energy storage device that is connected to the closing device that, when the closing device is open, contains stored energy.

8. The card reader according to claim 7 further comprising a sliding tongue connected to said cradle that follows the movements of said cradle whose free end is formed as a moveable hook;

and a pin on said closing device that, when said closing device is open to insert the second card in the second slot, is secured by a moveable hook to prevent the release of the energy stored in said second energy storage device.

*9. A method of controlling a login procedure of a plurality of cards inserted in card slots of a device, the method comprising:*

*detecting a first insertion of a first card in a first slot of a device;*

*logging the first card into the device after the detected first insertion;*

*detecting a second insertion of a second card in a second slot of the device after logging the first card into the device;*

*detecting a change in a position of the first card in the device;*

*logging the first card out of the device based on the detected change in the position; and*

*logging the second card into the device after logging the first card out of the device.*

*10. The method of claim 9 further comprising monitoring a second position of the second card in the device.*

*11. The method of claim 9 wherein the change in the position is detected using a light sensor.*

*12. A method of controlling a logout procedure of a plurality of cards inserted in card slots of a device, the method comprising:*

*detecting a first insertion of a first card in a first slot of a device;*

*logging the first card into the device after the detected first insertion;*

*detecting a second insertion of a second card in a second slot of the device after logging the first card into the device;*

*logging the second card into the device after the detected second insertion;*

*detecting a change in a position of the first card in the device;*

*logging the second card out of the device based on the detected change; and*

*logging the first card out of the device after logging the second card out of the device.*

*13. The method of claim 12 wherein the change in the position is detected using a light sensor.*

*14. A card reader comprising:*

*a first insertion slot configured to accept a first card;*

*a second insertion slot configured to accept a second card; and*

*a monitoring device configured to*

*detect a first insertion of the first card in the first insertion slot;*

*log the first card into a device after the detected first insertion;*

*detect a second insertion of the second card in the second insertion slot after logging the first card into the device;*

*log the second card into the device after the detected second insertion;*

*detect a change in a position of the first card;*

*log the second card out of the device based on the detected change; and*

*log the first card out of the device after logging the second card out of the device.*

*15. The card reader of claim 14 wherein the monitoring device comprises a light sensor configured to detect the change in the position of the first card.*

*16. The card reader of claim 14 wherein the monitoring device comprises a contact spring configured to indicate the first insertion of the first card based on an electrical contact with the first card.*

*17. The card reader of claim 16 wherein the monitoring device logs the first card into the device by exchanging data with a memory of the first card using the electrical contact with the first card.*

*18. A card reader comprising:*

*a first insertion slot configured to accept a first card;*

*a second insertion slot configured to accept a second card;*

*a monitoring device configured to*

*log the first card into a device after insertion of the first card in the first insertion slot; and*

*log the second card into the device after insertion of the second card in the second insertion slot and after logging the first card into the device; and*

*a cover configured to prevent removal of the first card from the first insertion slot before logging the second card out of the device, wherein the cover comprises a stop base extending from an edge of the cover to abut the second card if the second card is inserted in the second insertion slot and a handle extending from a front surface of the cover to abut a housing of the device if the second card is inserted in the second insertion slot.*

*19. The card reader of claim 18 wherein the cover further comprises a cutout in a surface of the cover, and further wherein the cover is configured to move so that the cutout is positionable to allow access to the first insertion slot if the second card is not inserted in the second insertion slot.*

*20. A card reader comprising:*

*means for accepting a first card;*

*means for accepting a second card; and*

*a monitoring device comprising:*

*means for detecting a first insertion of the first card into the means for accepting the first card;*

*means for logging the first card into a device after the detected first insertion;*

*means for detecting a second insertion of the second card into the means for accepting the second card after logging the first card into the device;*

*means for logging the second card into the device after the detected second insertion;*

*means for detecting a change in a position of the first card;*

*means for logging the second card out of the device based on the detected change; and*

*means for logging the first card out of the device after logging the second card out of the device.*

*21. The card reader of claim 20, further comprising means for covering the means for accepting the second card.*

*22. The card reader of claim 21, further comprising means for ejecting the second card when the means for covering allows access to the means for accepting the second card.*

*23. A card reader comprising:*

*means for accepting a first card;*

*means for accepting a second card;*

*means for logging the first card into a device after insertion of the first card into the means for accepting the first card;*

*means for logging the second card into the device after insertion of the second card into the means for accepting the second card and after logging the first card into the device; and*

*means for preventing removal of the first card from the means for accepting the first card before logging the second card out of the device, wherein the means for preventing removal comprises a stop base extending from an edge of the means for preventing removal to abut the second card if the second card is inserted in the means for accepting the second card and a handle extending from a front surface of the means for preventing removal to abut a housing of the device if the second card is inserted in the means for accepting the second card.*

*24. The card reader of claim 23, further comprising means for ejecting the first card from the device.*

* * * * *